(12) United States Patent
Bateman

(10) Patent No.: US 7,559,171 B2
(45) Date of Patent: Jul. 14, 2009

(54) ADJUSTABLE FISHING ROD HOLDER

(76) Inventor: Robert S. Bateman, 136 Earl Ave., Glassboro, NJ (US) 08028

( * ) Notice: Subject to any disclaimer, the term of this patent is extended or adjusted under 35 U.S.C. 154(b) by 0 days.

(21) Appl. No.: 12/070,105

(22) Filed: Feb. 15, 2008

(65) Prior Publication Data
US 2009/0145016 A1  Jun. 11, 2009

Related U.S. Application Data

(60) Provisional application No. 61/005,540, filed on Dec. 6, 2007.

(51) Int. Cl.
*A01K 97/10* (2006.01)
(52) U.S. Cl. .................. 43/21.2; 248/514; 248/530; 248/533; 248/538
(58) Field of Classification Search .............. 43/21.2, 43/15, 16; 248/514, 515, 520, 528, 530, 248/533, 538, 539
See application file for complete search history.

(56) References Cited

U.S. PATENT DOCUMENTS

| | | | | |
|---|---|---|---|---|
| 440,727 | A * | 11/1890 | Sheafe ................. | 248/530 |
| 1,891,163 | A * | 12/1932 | Kabele ................. | 248/533 |
| 2,419,378 | A * | 4/1947 | Thomas et al. .......... | 43/15 |
| 2,481,272 | A * | 9/1949 | Williams .............. | 248/514 |
| 2,506,824 | A * | 5/1950 | Brown et al. .......... | 248/515 |
| 2,541,146 | A * | 2/1951 | Bahr .................. | 248/538 |
| 2,573,635 | A * | 10/1951 | Williams .............. | 248/514 |
| 2,618,090 | A * | 11/1952 | Nobuyoshi ............. | 43/15 |
| 2,899,155 | A * | 8/1959 | Rogers ................ | 43/21.2 |
| 2,973,929 | A * | 3/1961 | Zawadzki ............. | 248/514 |
| 3,000,599 | A * | 9/1961 | Honig ................. | 248/515 |
| 3,014,679 | A * | 12/1961 | Jepson ................ | 43/15 |
| 3,162,408 | A * | 12/1964 | Markman .............. | 248/515 |
| 3,307,812 | A * | 3/1967 | Brenner .............. | 248/539 |
| 3,359,928 | A * | 12/1967 | Gamble ............... | 248/514 |
| 3,659,369 | A * | 5/1972 | Hermanson ........... | 43/21.2 |
| 3,708,141 | A * | 1/1973 | Friedgen et al. ....... | 248/515 |
| 4,012,861 | A * | 3/1977 | Gellatly .............. | 43/15 |
| 4,017,998 | A * | 4/1977 | Dumler ............... | 43/21.2 |

(Continued)

FOREIGN PATENT DOCUMENTS

DE  19917027 A1 * 1/2001

(Continued)

*Primary Examiner*—Darren W Ark
(74) *Attorney, Agent, or Firm*—Stuart M. Goldstein

(57) ABSTRACT

A fishing rod holder has control plate attached to an elongated shaft with a longitudinal axis. One end of the shaft is configured to penetrate the ground or otherwise be secured to render the holder stationary and immoveable, even when a fish takes the bait. The control plate has a plurality of adjustment openings for receiving stop members. The fishing rod holder also has a tubular rod holder component which is pivotably attached to the control plate. The rod holder component can thus be positioned in a variety of angles in relation to the longitudinal axis of the shaft, by pivoting the rod holder component so that it contacts a stop member extending through one of the adjustment openings. When so positioned and a fish is hooked onto the line extending from the rod, the fish can be brought in without having to remove the fishing rod, which continues to be pivotably supported by the holder component. Upon release of tension on the line, the holder component automatically resets to its original position.

8 Claims, 5 Drawing Sheets

U.S. PATENT DOCUMENTS

| | | | | |
|---|---|---|---|---|
| 4,676,019 A * | 6/1987 | Engles | | 43/21.2 |
| 4,852,290 A * | 8/1989 | Wallace et al. | | 43/21.2 |
| 5,054,737 A * | 10/1991 | DeLancey | | 43/21.2 |
| 5,068,996 A * | 12/1991 | Shank | | 43/21.2 |
| 5,184,797 A * | 2/1993 | Hurner | | 43/21.2 |
| 5,325,620 A * | 7/1994 | Reed et al. | | 43/21.2 |
| 5,335,440 A * | 8/1994 | Williams | | 43/21.2 |
| 5,359,802 A * | 11/1994 | Gutierrez | | 43/21.2 |
| 5,488,798 A * | 2/1996 | Beachel | | 43/21.2 |
| 5,501,028 A * | 3/1996 | Hull et al. | | 43/21.2 |
| 5,520,312 A * | 5/1996 | Maddox | | 43/21.2 |
| 5,542,205 A * | 8/1996 | Updike | | 43/21.2 |
| 5,546,693 A * | 8/1996 | Stockton et al. | | 43/21.2 |
| 5,566,495 A * | 10/1996 | Kim et al. | | 43/21.2 |
| 5,625,974 A * | 5/1997 | Demaio | | 43/21.2 |
| 5,647,161 A * | 7/1997 | Miller, Sr. | | 43/21.2 |
| 5,727,583 A * | 3/1998 | Kennedy | | 248/514 |
| 5,761,844 A * | 6/1998 | Horschel | | 43/21.2 |
| 5,778,592 A * | 7/1998 | Malmberg | | 43/21.2 |
| 5,802,758 A * | 9/1998 | Frehling | | 43/15 |
| 5,806,827 A * | 9/1998 | Gilmore | | 248/534 |
| 5,813,161 A * | 9/1998 | Yai | | 43/15 |
| 5,921,014 A * | 7/1999 | Lee | | 43/21.2 |
| 5,953,846 A * | 9/1999 | Shelton | | 43/21.2 |
| 5,992,717 A * | 11/1999 | Clewes et al. | | 43/21.2 |
| 6,088,946 A * | 7/2000 | Simmons | | 43/21.2 |
| 6,089,652 A * | 7/2000 | Miller, Sr. | | 43/21.2 |
| 6,141,898 A * | 11/2000 | Shelton | | 43/21.2 |
| 6,196,513 B1 * | 3/2001 | Edwards et al. | | 248/528 |
| 6,269,990 B1 * | 8/2001 | Gray | | 43/21.2 |
| 6,301,820 B1 * | 10/2001 | Rosa | | 43/15 |
| 6,438,889 B1 * | 8/2002 | Handy | | 43/21.2 |
| 6,484,433 B1 * | 11/2002 | Greene | | 43/21.2 |
| 6,591,541 B1 * | 7/2003 | Cummings | | 43/21.2 |
| 6,898,893 B1 * | 5/2005 | Mukdaprakorn | | 43/21.2 |
| 6,931,782 B1 * | 8/2005 | Pitcock | | 43/21.2 |
| 6,962,018 B1 * | 11/2005 | King | | 43/21.2 |
| 7,197,845 B2 * | 4/2007 | Wilcox et al. | | 43/21.2 |
| 2003/0230023 A1 * | 12/2003 | Lu | | 43/21.2 |
| 2005/0229470 A1 * | 10/2005 | King | | 43/21.2 |
| 2006/0218844 A1 * | 10/2006 | Oliver et al. | | 43/21.2 |
| 2006/0265933 A1 * | 11/2006 | Knock | | 43/21.2 |
| 2007/0119089 A1 * | 5/2007 | Nicholson | | 43/21.2 |
| 2008/0053361 A1 * | 3/2008 | Nicholson | | 248/514 |
| 2009/0094878 A1 * | 4/2009 | Dungan | | 43/15 |

FOREIGN PATENT DOCUMENTS

| | | | | |
|---|---|---|---|---|
| DE | 10223628 A1 * | 12/2003 | | |
| FR | 2566622 A1 * | 1/1986 | | |
| FR | 2639183 A1 * | 5/1990 | | |
| FR | 2685606 A1 * | 7/1993 | | |
| GB | 2175184 A * | 11/1986 | | |
| GB | 2344986 A * | 6/2000 | | |
| JP | 02234625 A * | 9/1990 | | |
| JP | 10243763 A * | 9/1998 | | |
| JP | 2001008596 A * | 1/2001 | | |
| JP | 2002017226 A * | 1/2002 | | |

* cited by examiner

ADJUSTABLE FISHING ROD HOLDER

RELATED APPLICATION

This application claims the benefit of provisional application Ser. No. 61/005,540, filed on Dec. 6, 2007.

BACKGROUND OF THE INVENTION

Fishing rod holders provide a convenient means to maintain fishing rods in fishing mode without the need to physically grasp the rod. They also allow the angler/fisherman to utilize more than one fishing rod at the same time. Rods can be easily and quickly set in a row of holders to maximize the fishing experience.

Fishing rod holders are routinely used on sandy beaches and on the shorelines of streams and rivers when casting. Most fishing rod holders employed in this manner are positioned such that they penetrate through the surface of the ground a sufficient depth so that the holder is immoveable. The holder must be stable enough to hold and maintain a fishing rod, with its reel and attachments. Most importantly, the fishing rod holder must be sufficiently secure to remain in position when a large fish is on the line.

Fishing rod holders which are adjustable to several fishing and non-fishing mode positions provide an added benefit to the angler/fishermen. A holder which can easily be adjusted to allow the fishing rod to be maintained at a number of angles offers flexibility and increases the effectiveness of the fishing rod.

While there are a number of conventional fishing rod holders which will adequately secure a fishing rod, and others which are adjustable, there are few which combine these important features with simplicity of adjustment coupled with versatility of use. There are none which do all these things and also permit an angler/fisherman the ability to bring in fish on the line while maintaining the fishing rod within the holder and, when tension is lost in the line or the rod removed from the holder, to automatically reset the holder and replaced rod at the desired, pre-selected fishing angle.

SUMMARY OF THE INVENTION

It is thus an object of the present invention to overcome the limitations and disadvantages of prior fishing rod holders.

It is an object of the present invention to provide a fishing rod holder which allows the fishing rod to be maintained at a variety of pre-selected angles.

It is a further object of the present invention to provide a fishing rod holder which can be readily, simply, and quickly adjusted to different fishing rod positions.

It is another object of the present invention to provide a fishing rod holder which permits the ready use of multiple fishing rods at the same time.

It is still another object of the present invention to provide a fishing rod holder which allows the angler/fisherman the ability to set a hook on a fishing rod without removing the rod from the holder.

It is another object of the present invention to provide a fishing rod holder which allows the angler/fisherman the ability to easily snatch a fishing rod from the holder and then return it to the holder, with the holder automatically returning to its originally set angled position.

It is a further object of the present invention to provide a fishing rod holder which permits fishing rods to be set in the holder to allow the angler/fisherman a better view of the tip of the rod.

It is still another object of the present invention to provide a fishing rod holder which can be quickly and effectively positioned for baiting a line and for storing a fishing rod.

It is another object of the present invention to provide a fishing rod holder which allows the fishing rod to remain in the holder, while a hooked fish is being reeled in, and then automatically resets the rod in position once the fish is released.

It is still another object of the present invention to provide a fishing rod holder which is practical and economical to manufacture.

These and other objects are accomplished by the present invention, a fishing rod holder which has a control plate attached to an elongated shaft with a longitudinal axis. One end of the shaft is configured to penetrate the ground or otherwise be secured to render the holder stationary and immoveable, even when a fish takes the bait. The control plate has a plurality of adjustment openings for receiving stop members. The fishing rod holder also has a tubular rod holder component which is pivotably attached to the control plate. The rod holder component can thus be positioned in a variety of angles in relation to the longitudinal axis of the shaft, by pivoting the rod holder component so that it contacts a stop member extending through one of the adjustment openings. When so positioned and a fish is hooked onto the line extending from the rod, the fish can be brought in without having to remove the fishing rod, which continues to be pivotably supported by the holder component. Upon release of tension on the line, the holder component automatically resets to its original position.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
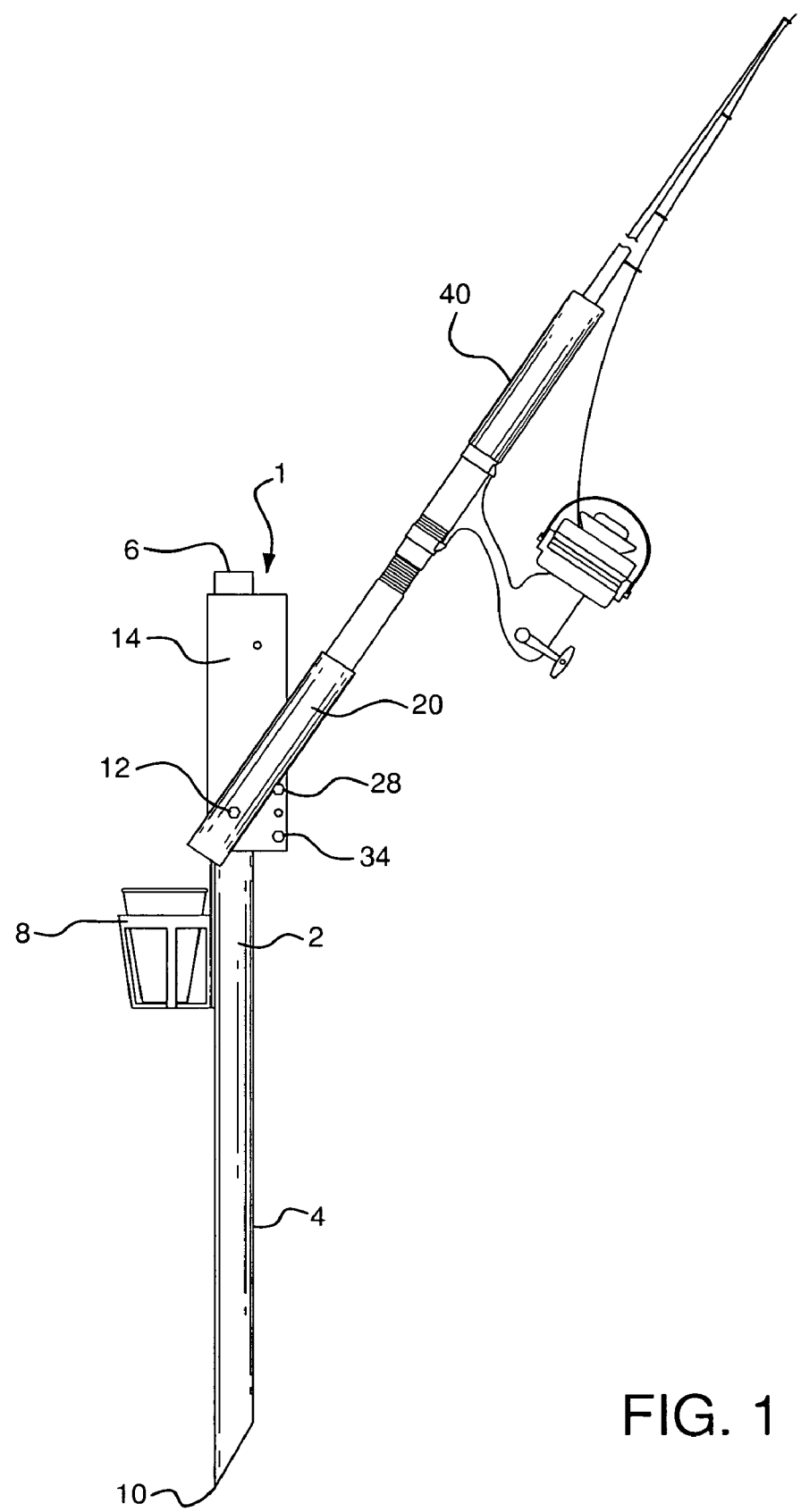
FIG. 1 is an elevation view of the present invention in an exemplar angular fishing position.

Fishing rod holder 1 comprises elongated shaft 2 with longitudinal axis 3 extending through the shaft. Shaft 2 is made of a rigid, sturdy material such as steel, hard plastic, PVC piping or even a hardwood. The material must be sturdy enough to allow pointed end 10, located at the bottom of lower section 4 of shaft 2, to penetrate the surface of the ground and embed shaft 2 in position to maintain holder 1 substantially perpendicular to the ground. Bait cup holder 8 is secured to shaft 2 for the convenience of the user.

Figure 6:
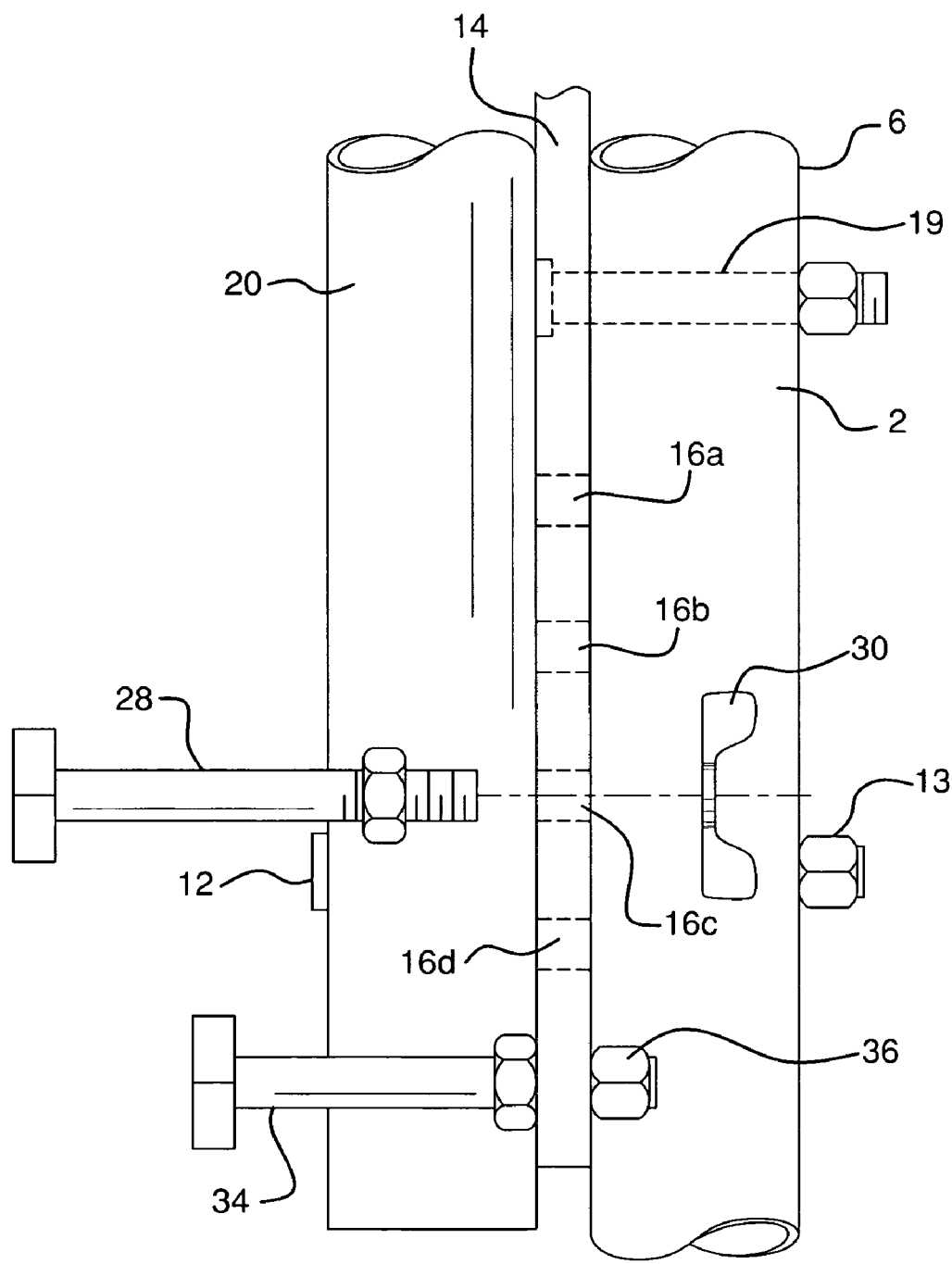
FIG. 6 is an elevational, partially sectional and exploded view taken from FIG. 4.
Figure 7:
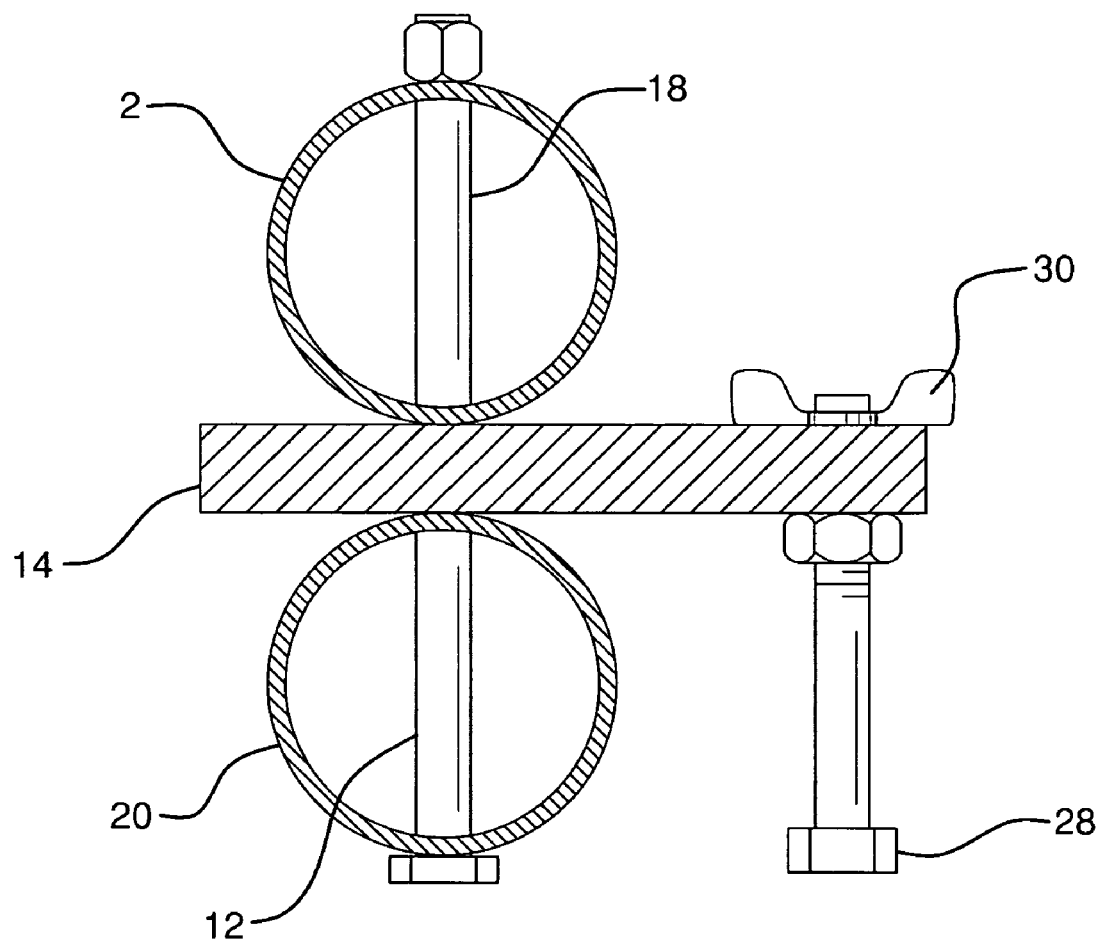
FIG. 7 is a sectional view taken from FIG. 4.

Control plate 14 is a substantially planar component with adjustment openings 16a, 16b, 16c, 16d and storage position opening 17 extending therethrough. Control plate 14 is attached to upper section 6 of shaft 2 by several bolt and nut connections. It is anticipated that three such connections will be used. Two connections extend through shaft 2 and terminate at control plate 14. The topmost of these connections is shown at 18 in FIG. 7 and the lower, middle connection is shown at 19 in FIG. 6. The third, lowermost connection bolt 12 extends completely through shaft 2, control plate 14 and fishing rod holder 20. It is secured by nut 13 as seen in FIG. 6.

Figure 4:
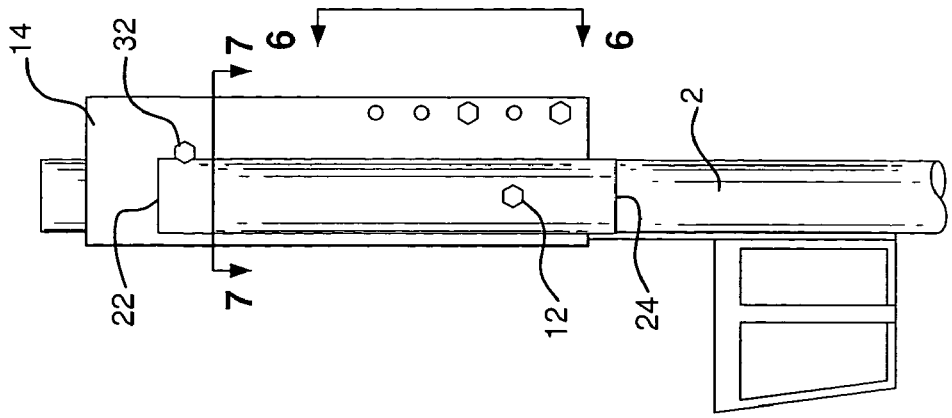
FIG. 4 is an elevation view of the upper section of the present invention in a fishing rod storage position.
Figure 3:
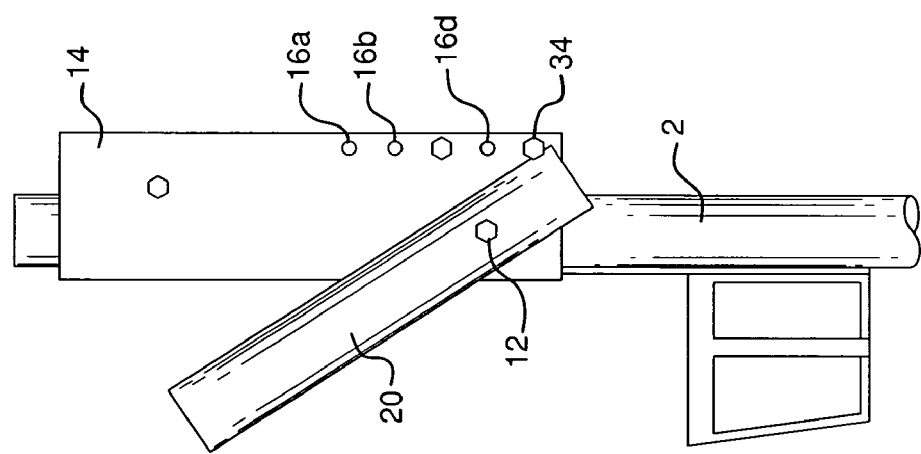
FIG. 3 is an elevation view of the upper section of the present invention in a rearward, baiting position.

Fishing rod holder component 20 comprises a substantially open cylindrical tube, open at its top end 22 and, preferably, open at its bottom end 24 as well. Holder component 20 is rotatably mounted to control plate 14 and shaft 2 by elongated bolt 12 and nut connection 13, such that the holder component, while securely attached to the control plate, is still readily rotatable to a variety of angles in relation to longitudinal axis 3 of shaft 2, as depicted in FIGS. 2-4.

The angle at which holder component 20 is positioned and maintained is determined by the placement of one or more removeable stop members, which preferably comprise bolt 28 and wingnut connector 30 configured to extend through adjustment openings 16a, 16b, 16c and 16d in control plate 14. By rotating holder component 20 about bolt connection 12, the holder will assume various angles in relation to longitudinal shaft 3 of shaft 2, as it rests on stop member bolt 28. The angle will depend on through which adjustment opening, 16a, 16b, 16c, or 16d, stop member bolt 28 extends.

Figure 2:
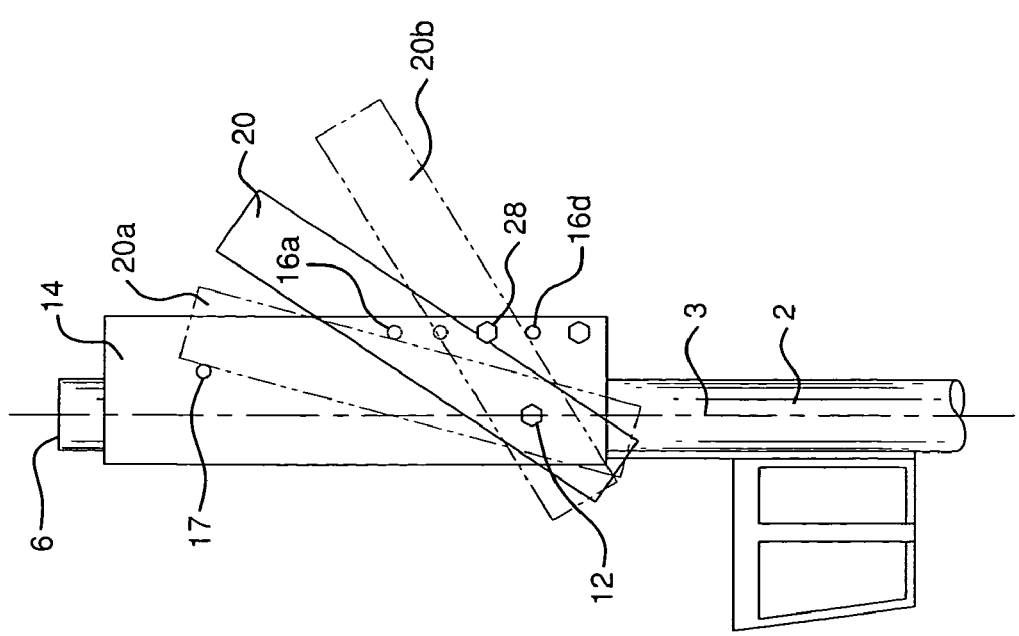
FIG. 2 is an elevation view of the upper section of the present invention in the angular position shown in FIG. 1 and in other anticipated angular positions.

FIG. 2 shows fishing rod holder in several of its various configurations of use. For example, holder component 20 in FIG. 2 is shown positioned at one angle in relation to longitudinal axis 3 of shaft 2 as it rests against stop member bolt 28 in adjustment opening 16c. To reposition holder component 20 to a shallower, more acute angle in relation to longitudinal axis 3, the holder component is rotated up to a vertical position. Wingnut 30 of stop member bolt 28 is unscrewed from the bolt and the bolt is removed from adjustment opening 16c. Stop member bolt 28 is then inserted into adjustment opening 16a and the holder component is then rotated down to assume the position 20a shown in FIG. 2. If holder component 20 is then to be changed to assume the position 20b, a larger acute, angle in relation to longitudinal axis 3, stop member bolt 28 is removed from adjustment opening 16a and inserted into lower adjustment opening 16d. Holder component 20 is rotated downward where it again rests and is maintained on stop member bolt 28.

Thus, holder 1 allows the angler/fisherman, once he or she casts the fishing line, to then place fishing rod 40 into holder component 20, set at the most convenient and effective fishing angle, an angle which allows the best view of the tip of the rod, or one which is most comfortable for the user.

When there is a bite on the line, holder component 20 is free to rotate so the fish can be reeled in without having to remove the rod from the holder component. Holder component 20 automatically resets to its originally set position when the fish is released from the line, line tension is relieved, or the fishing rod is removed from and then replaced back into the holder.

Holder component 20 also can be set in a substantially vertical, up and down, fishing rod storage position, i.e. approximately a zero degree angle in relation to longitudinal axis 3 of shaft 2, as seen in FIG. 4. To accomplish this, holder component 20 is rotated from one of the positions shown in FIG. 2, rearward of shaft 2 and control plate 14, to a vertical, straight up and down position. Insertion of stop member bolt 32 into storage opening 17 in control plate 14, will restrict rotation of holder component 20 forward, thus maintaining the holder component in a vertical configuration. See FIG. 4.

Holder component 20 can also be rotated rearward about elongated bolt 12 to permit the line of a fishing rod to be baited. Rearward movement of holder component 20 is restricted here by stop member bolt 34 fixedly positioned by nut 36 within control plate 14. See FIG. 3. After the line is baited and it is ready to be cast, fishing rod 40 is simply removed from holder component 20, which is then rotated and set to one of the forward positions depicted in FIG. 2. After the line is cast, the rod is again replaced into holder component 20.

Fishing rod holder 1 of the present invention provides the angler/fisherman the ability to set and monitor multiple fishing rods at one time. Rods within holder 1 are easily baited and rebaited, if necessary. It is now possible for one person to hook fish on multiple rods positioned in several holders 1 at the same time and actually handle and reel them in without losing a catch.

Figure 5:
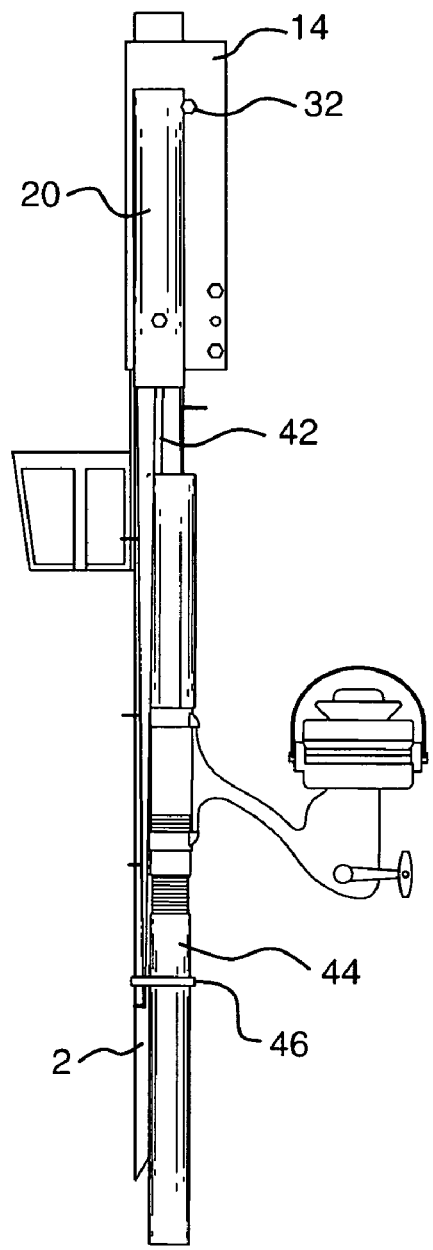
FIG. 5 is an elevation view of the present invention in transport mode.

Fishing rod holder 1 can also be conveniently used to store a fishing rod for transport as seen in FIG. 5. For this use, holder component 20 is positioned in the straight, vertical position shown in FIG. 4. The thinner, working end 42 of rod 40 is inserted within holder component 20 through open bottom 24 of the holder component, such that the lower handle section 44 of the rod extends adjacent to and along shaft 2. An elastic band 46 or similar tie is used to secure rod 40 to holder 1.

Fishing rod holder 1 is optimally designed to be implanted, however, it is not contemplated that the placement of the fishing rod holder 1 be restricted to penetration in the ground on a beach, riverbank, or other shoreline. Lower section 4 of shaft 2 can be clamped or otherwise immoveably secured to the gunnel or other supporting structure of a boat. Lines can be cast from the boat and rods then set into holder components 20, as fishing proceeds from the sides of the boat.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. An adjustable fishing rod holder comprising:
   an elongated shaft with a longitudinal axis and upper and lower sections, the lower section having end means for maintaining the shaft in an immoveable position;
   a fishing rod holder;
   means extending through the holder and the shaft for rotatably connecting the holder to the shaft to place the holder in a plurality of angular positions in relation to the longitudinal axis of the shaft;
   control means mounted solely on one side of the upper section of the shaft for maintaining the holder in a plurality of different angular positions in relation to the longitudinal axis of the shaft, said control means comprising a control plate immoveably connected to the shaft and having a plurality of adjustment openings configured in a vertical line adjacent to one edge of the control plate, the vertical line of adjustment openings being parallel to the longitudinal axis of the shaft, the adjustment means further comprising at least one stop means removeably insertable into any of the plurality of openings for maintaining the holder in said plurality of different angular positions in relation to the longitudinal axis of the shaft; and wherein the means extending through the holder and the shaft for rotatably connecting the holder to the shaft further comprises an elongated member having a longitudinal axis, the elongated member extending through the control plate, the fishing rod holder, and the shaft along the longitudinal axis thereof for rotatably connecting the holder means to the control plate.

2. The fishing rod holder as in claim 1 wherein the means extending through the holder and the shaft rotatably positions and maintains the holder in relation to the control means.

3. The fishing rod holder as in claim 1 wherein the control means maintains the holder in both a plurality of acute and oblique angular positions in relation to the longitudinal axis of the shaft.

4. The fishing rod holder as in claim 1 wherein the at least one stop means further comprises a plurality of stop means which extend through one of the adjustment openings and an other opening to maintain the holder in different angular positions in relation to the longitudinal axis of the shaft.

5. An adjustable fishing rod holder comprising:
  an elongated shaft with a longitudinal axis and upper and lower sections, the lower section having end means for maintaining the shaft in an immoveable position within the ground;
  a control plate immoveably connected to and mounted solely on one side of the upper section of the shaft;
  holder means for placement and retention of a fishing rod;
  means extending through the control plate, the holder means, and the shaft for rotatably connecting the holder means to the control plate to place the holder means in a plurality of angular positions in relation to the longitudinal axis of the shaft, the means extending through the control plate, the holder means, and the shaft for rotatably connecting the holder means to the control plate comprising an elongated member having a longitudinal axis, the elongated member extending through the control plate, the holder means, and the shaft along the longitudinal axis thereof for rotatably connecting the holder means to the control plate; and
  adjustment means located within the control plate for maintaining the holder means in said plurality of angular positions in relation to the longitudinal axis of the shaft, said adjustment means comprising a plurality of adjustment openings extending through the control plate configured in a vertical line adjacent to one edge of the control plate, the vertical line of adjustment openings being parallel to the longitudinal axis of the shaft, the adjustment means further comprising at least one stop member removeably insertable into any of the plurality of adjustment openings to maintain the holder means in one of said plurality of angular positions.

6. The fishing rod holder as in claim 5 wherein the adjustment means is configured to maintain the holder means in a plurality of acute and oblique angular positions in relation to the longitudinal axis of the shaft.

7. The fishing rod holder as in claim 5 wherein the at least one stop member further comprises a plurality of stop members which extend through one of the adjustment openings and an other opening to maintain the holder means in different angular positions in relation to the longitudinal axis of the shaft.

8. The fishing rod holder as in claim 5 wherein the end means maintains the shaft in stationary position by penetrating a surface of the ground.

* * * * *